(12) United States Patent
McCall et al.

(10) Patent No.: US 10,024,161 B2
(45) Date of Patent: Jul. 17, 2018

(54) TURBINE BLADE TIP REPAIR (71) Applicant: United Technologies Corporation, Hartford, CT (US)

(72) Inventors: Thomas McCall, Carrollton, TX (US); David J. Hiskes, Vernon, CT (US); Christopher J. Bischof, Southlake, TX (US); Eric W. Stratton, Mansfield, TX (US); Anthony J. Pietroniro, Cromwell, CT (US); Mary E. Schubert, Manchester, CT (US); Kayleigh J. Brown, Euless, TX (US); Michael J. Minor, Arlington, TX (US)

(73) Assignee: United Technologies Corporation, Farmington, CT (US)

( * ) Notice: Subject to any disclaimer, the term of this patent is extended or adjusted under 35 U.S.C. 154(b) by 529 days.

(21) Appl. No.: 14/617,859

(22) Filed: Feb. 9, 2015

(65) Prior Publication Data

US 2016/0230558 A1 Aug. 11, 2016

(51) Int. Cl.
*F01D 5/00* (2006.01)
*B23P 6/00* (2006.01)
(Continued)

(52) U.S. Cl.
CPC ............... *F01D 5/005* (2013.01); *B23P 6/00* (2013.01); *B23P 6/007* (2013.01); *B23P 6/045* (2013.01); *C23C 28/021* (2013.01); *C23C 28/027* (2013.01); *C25D 5/14* (2013.01); *C25D 5/40* (2013.01); *C25D 15/00* (2013.01); *F01D 5/147* (2013.01); *F01D 5/20* (2013.01); *F01D 5/288* (2013.01); *F05D 2220/30* (2013.01);
(Continued)

(58) Field of Classification Search
CPC .. C25D 15/00; C25D 5/40; C25D 5/14; F01D 5/005; F01D 5/147; F01D 5/20; F01D 5/228; C23C 28/027; C23C 28/021; B23P 6/00; B23P 6/007; B23P 6/045; F05D 2230/10; F05D 2230/30; F05D 2230/611; F05D 2230/177; F05D 2230/80; F05D 2240/31
See application file for complete search history.

(56) References Cited

U.S. PATENT DOCUMENTS

| 4,822,248 | A | * | 4/1989 | Wertz | B23P 6/007 29/402.07 |
|---|---|---|---|---|---|
| 5,972,424 | A | | 10/1999 | Draghi et al. | |
| 6,588,103 | B2 | | 7/2003 | Fernihough et al. | |
| 8,343,573 | B2 | * | 1/2013 | Jensen | B22F 5/04 427/140 |

(Continued)

FOREIGN PATENT DOCUMENTS

EP 2540961 A2 1/2013

OTHER PUBLICATIONS

Extended European Search Report for EP Patent Application No. 16154701.3, dated Oct. 4, 2016.

(Continued)

*Primary Examiner* — Ian Paquette
(74) *Attorney, Agent, or Firm* — Bachman & LaPointe, P.C.

(57) ABSTRACT

A method for repairing a blade wherein the blade comprises a metallic substrate shaped to define an airfoil having a tip. A coating is on the tip. The method comprises: machining to at least partially remove the coating; plating a nickel-based base layer; and plating an abrasive layer comprising a nickel-based matrix and an abrasive.

12 Claims, 6 Drawing Sheets

(51) Int. Cl.
  *B23P 6/04*     (2006.01)
  *F01D 5/28*     (2006.01)
  *C23C 28/02*    (2006.01)
  *F01D 5/20*     (2006.01)
  *F01D 5/14*     (2006.01)
  *C25D 5/14*     (2006.01)
  *C25D 5/40*     (2006.01)
  *C25D 15/00*    (2006.01)

(52) U.S. Cl.
  CPC ...... *F05D 2230/10* (2013.01); *F05D 2230/80* (2013.01); *F05D 2240/31* (2013.01); *F05D 2300/177* (2013.01); *F05D 2300/611* (2013.01)

(56) References Cited

U.S. PATENT DOCUMENTS

| | | |
|---|---|---|
| 9,127,550 B2 * | 9/2015 | Hunt .................. F01D 5/005 |
| 2005/0014010 A1 | 1/2005 | Dumm et al. |
| 2005/0091848 A1 | 5/2005 | Nenov et al. |
| 2011/0150636 A1 | 6/2011 | Tholen et al. |
| 2011/0302781 A1 | 12/2011 | Dodd, IV et al. |
| 2012/0051934 A1 | 3/2012 | Allen |
| 2013/0004328 A1 | 1/2013 | Wrabel et al. |

OTHER PUBLICATIONS

European Search Report for EP Patent Application No. 16154701.3, dated Jun. 13, 2016.
Singapore Office action dated Apr. 24, 2018 for Singapore Patent Application No. 10201600338Q.

\* cited by examiner

TURBINE BLADE TIP REPAIR

BACKGROUND

The disclosure relates to gas turbine engines. More particularly, the disclosure relates to tip repairs of turbine blades of such engines.

In many gas turbine engines, turbine section blades have abrasive tips for interfacing with abradable coatings on the inner diameter (ID) surface of blade outer air seals (BOAS) surrounding said blades. A typical turbine blade comprises a metallic substrate (e.g., nickel-based superalloy or cobalt-based superalloy) shaped to form an attachment root (for attaching to a disk) and an airfoil. The exemplary blades further typically include a platform between the attachment root and airfoil. Blade substrates may be cast and machined and may feature internal cooling passageways for receiving a cooling airflow. The cooling passages may have one or more inlets along the attachment root (e.g., at an inner diameter (ID) surface thereof) and many outlets distributed along the airfoil. External surfaces of the blade exposed to the gaspath may bear thermal barrier coatings (TBC). The blade tip (blade airfoil tip) may, however, bear an abrasive coating for interfacing with an abradable coating of the adjacent BOAS stage. An exemplary abrasive coating comprises an abrasive (e.g., cubic boron nitride (CBN)) in a metallic matrix (e.g., nickel alloy). In an exemplary method of manufacture, the abrasive and matrix are applied via electroplating.

In an exemplary specific method of original blade manufacture, a precursor of the substrate is cast (e.g., investment cast). In one or more machining stages, the substrate is machined leaving the airfoil overlong. In one example, it is overlong by 0.010 inch (0.25 millimeter). The length is measured relative to a datum such as a datum of a fir tree attachment root. The same datum provides the primary datum for subsequent processing discussed below. After this initial machining, the blade may be masked both interior and exterior in the vicinity of the tip. The blade tip may then be machined down to the final reference length through the substrate.

The as-cast blade substrate may include a squealer pocket along the tip. The machining may leave the pocket having a desired depth. Outlet passageways from trunks of the cooling passageway system may extend into a base of the squealer pocket.

Thereafter, the abrasive coating may be applied. The exemplary application method involves first applying a base layer and then applying the matrix and abrasive. The exemplary base layer comprises a nickel alloy (e.g., nickel-chromium-aluminum alloy) electroplate applied to a nominal base layer thickness.

Exemplary nominal base layer thickness is 0.0025 inch (0.0635 millimeter). Exemplary base layer application involves an initial flash of nickel followed by application of the remainder. This can provide enhanced adhesion of the base layer relative to directly applying the base layer alloy to the substrate. Eventually, due to diffusion with the nickel alloy, the very thin nickel flash layer will cease to be distinct.

After base layer application, the abrasive and matrix may be applied (e.g., via electroplating) to a desired abrasive layer thickness. Exemplary matrix is a nickel alloy (e.g., nickel-chromium-aluminum alloy which may be the same as that used for the base layer). An exemplary abrasive layer thickness is 0.0055 inch (0.14 millimeter). After such matrix application and any demasking/remasking, the thermal barrier coating may be applied via conventional means. Exemplary thermal barrier coating systems comprise a metallic bondcoat applied directly to the substrate and a ceramic thermal barrier coat applied to the bondcoat.

As the blade is used in engine operation, the tip will encounter wear and damage. Exemplary damage includes cracking and oxidation. A number of prior art tip repair techniques have been proposed and/or practiced. In one typical such technique, the blades are removed from the engine and repaired at an industrial mass production scale. Two basic such repairs are known: repairs using a preform; and repairs using in situ weld buildups.

Preform repairs involve machining off a substantial length of blade potentially even penetrating into the trunks of the internal passageways. A preformed replacement tip is then applied via techniques such as diffusion brazing. The tip may include a surface for reforming features such as the internal passageways and the squealer tip pocket. After attachment, finish machining may machine the preform down to the original blade substrate final reference length and abrasive coating may be applied in the same way as in the original manufacture.

In situ weld build-up repairs may similarly involve building up to a slight oversize/overlength followed by machining down to the original blade substrate final reference length and then duplicating the original tip coating. However, compared with use of preforms, the buildup will typically involve a much smaller degree of material removal from the preexisting substrate.

Each of the repair techniques has disadvantages. Preforms present economy of scale issues. After the first repair using a preform, a subsequent repair will require a larger preform and so on. Weld build-up repairs can place substantial stress on remaining substrate material. Even if the initial machining removes crack material and oxidation, the welding process itself may cause cracks in remaining substrate.

Weld build-up repair also has limited repeatability. The deep machining to remove damaged material in an original blade starts a cascade. The first weld repair damages material substantially below the original machined surface of the substrate. This requires that each subsequent weld repair have a relatively large further penetration into the substrate.

SUMMARY

One aspect of the disclosure involves a method for repairing a blade. The blade comprises a metallic substrate shaped to define an airfoil having a tip. A coating is on the tip. The method comprises: machining to at least partially remove the coating while leaving one or more artifacts of service damage; plating a nickel-based base layer; and plating an abrasive layer comprising a nickel-based matrix and an abrasive.

A further embodiment may additionally and/or alternatively include the machining reaching the substrate.

A further embodiment may additionally and/or alternatively include the substrate having a crack as one of the one or more artifacts of service damage and the machining only partially removing the crack.

A further embodiment may additionally and/or alternatively include the substrate having oxidation along the tip and the machining only partially removing the oxidation to leave an oxidized area as one of the one or more artifacts of service damage. In various examples, the oxidized area may have a thickness of at least 0.025 millimeter and/or a transverse dimension of at least 0.5 millimeter.

A further embodiment may additionally and/or alternatively include the method being performed a plurality of times on a given blade wherein: each time, the plating of the nickel-based layer is progressively deeper than the prior time.

A further embodiment may additionally and/or alternatively include the machining comprising a first machining and a second machining. The method further comprises: inspecting after the first machining; and responsive to the inspecting, determining a target depth for the second machining.

A further embodiment may additionally and/or alternatively include masking of the substrate before the second machining A further embodiment may additionally and/or alternatively include applying a ceramic coating along surfaces of the airfoil after the plating the abrasive layer.

A further embodiment may additionally and/or alternatively include the nickel-based base layer comprises a nickel chromium aluminum alloy.

A further embodiment may additionally and/or alternatively include blade repaired according to the method.

A further embodiment may additionally and/or alternatively include one or more cracks in the substrate as one of the one or more artifacts of service damage, at least partially filled by the nickel-based layer have height of at least 0.5 millimeter.

A further embodiment may additionally and/or alternatively include the nickel-based layer has height of at least 0.0050 inch (0.13 millimeter).

Another aspect of the disclosure involves a blade comprising a metallic substrate shaped to define an airfoil having a tip. A coating is on the tip, the coating comprising: a nickel-based base layer; and an abrasive layer comprising a nickel-based matrix and an abrasive. The substrate has cracks and the base layer at least partially fills the cracks.

A further embodiment may additionally and/or alternatively include one or more of the cracks having heights of at least 0.2 millimeter.

A further embodiment may additionally and/or alternatively include one or more of the cracks penetrating to a tip pocket from a pressure side surface or a suction side surface.

A further embodiment may additionally and/or alternatively include a method for making a plurality of the blades. The method comprises: removing a stage of blades from an engine; machining at least a first group of the removed blades to a common length to expose or clean the metallic substrate of each blade of the first group; applying the nickel-based layer to the metallic substrates of the first group as a batch; and applying the abrasive layer to the first group so that at least some of the first group become the plurality of blades.

A further embodiment may additionally and/or alternatively include tip preform repair or weld build-up repair of a second group of the removed blades.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
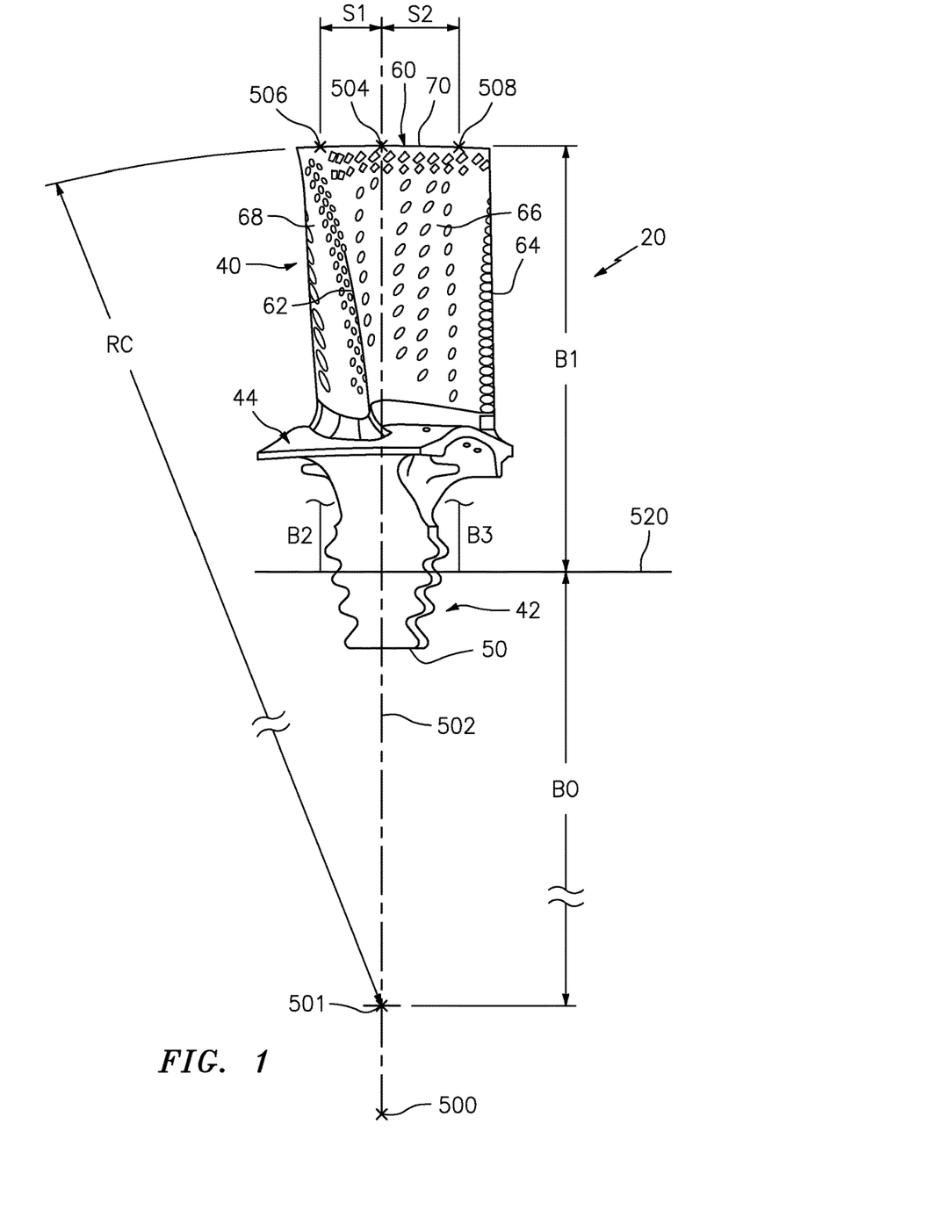
FIG. 1 is a front view of a turbine blade.
Figure 5:
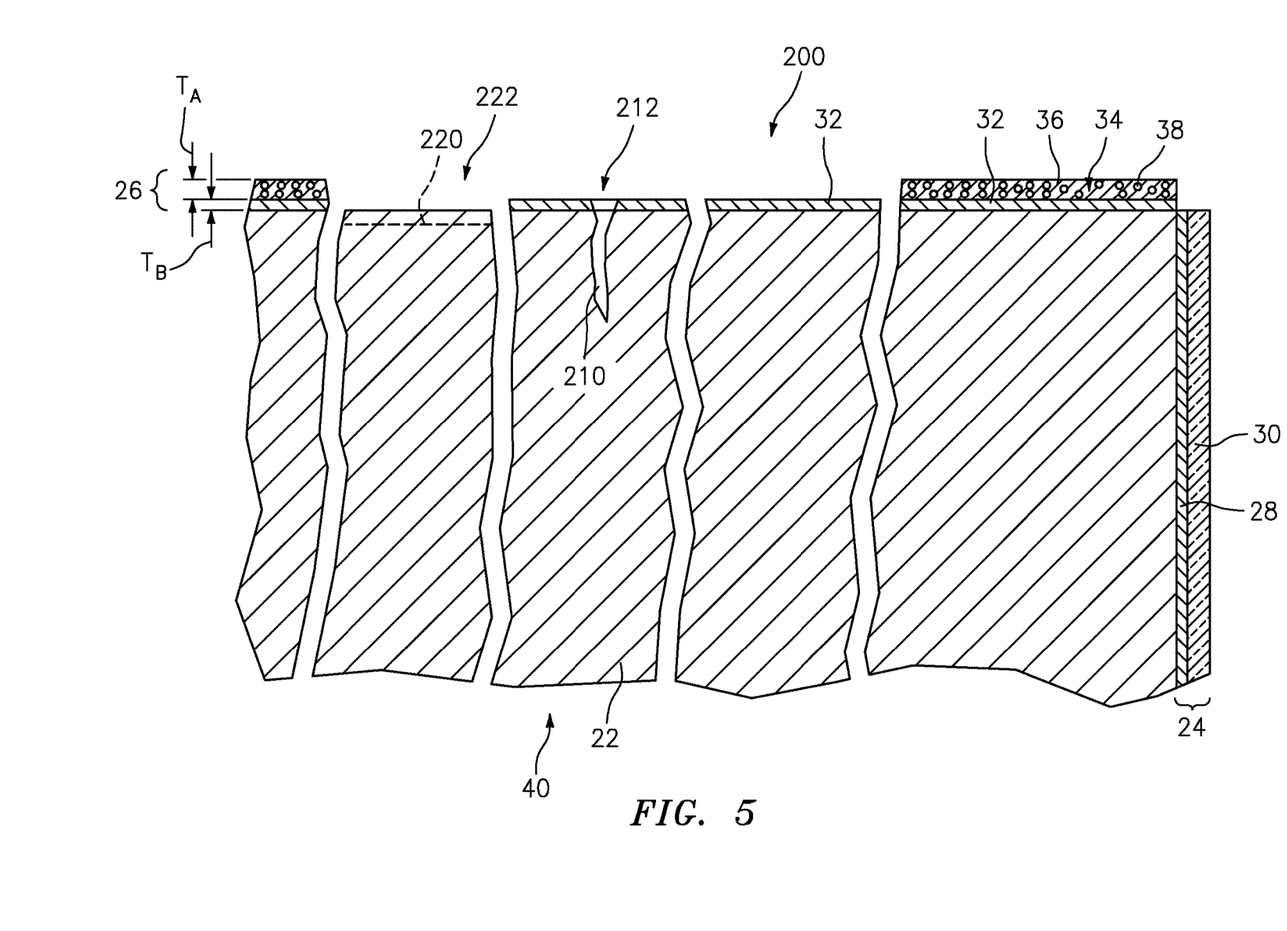
FIG. 5 is an enlarged simplified sectional view of the blade of FIG. 1 reflecting an original substrate.

FIG. 1 shows a turbine blade 20. The blade comprises a metallic substrate 22 (FIG. 5). The blade may further comprise one or more coatings. As is discussed below, the exemplary coatings may include a thermal barrier coating (TBC) system 24 and an abrasive coating system 26. Each of these coating systems may, in turn, include one or more layers. For example, the exemplary thermal barrier coating system 24 includes a metallic bondcoat 28 atop the substrate and a ceramic thermal barrier coating (TBC) layer 30 atop the bondcoat 28. Similarly, the abrasive coating system 26 may include a metallic underlayer (base layer) 32 and an abrasive layer 34. The abrasive layer 34 comprises a matrix 36 and abrasive particles 38 at least partially embedded in the matrix.

An exemplary substrate comprises a unitary metallic casting (e.g., of a nickel-based superalloy) and defines the overall gross features of the blade. The substrate and blade thus include an airfoil 40 and an attachment feature 42 (e.g., a firtree root). The blade and substrate may further include a platform 44 between the airfoil and the firtree root.

The firtree root 42 extends from an inboard end 50 forming an inboard end of the blade to an outboard end at an underside of the platform. The airfoil 40 extends from an inboard end at an outer surface (gaspath-facing surface) of the platform to a tip 60. The airfoil extends from a leading edge 62 to a trailing edge 64 and has a pressure side surface 66 and a suction side surface 68.

Figure 2:
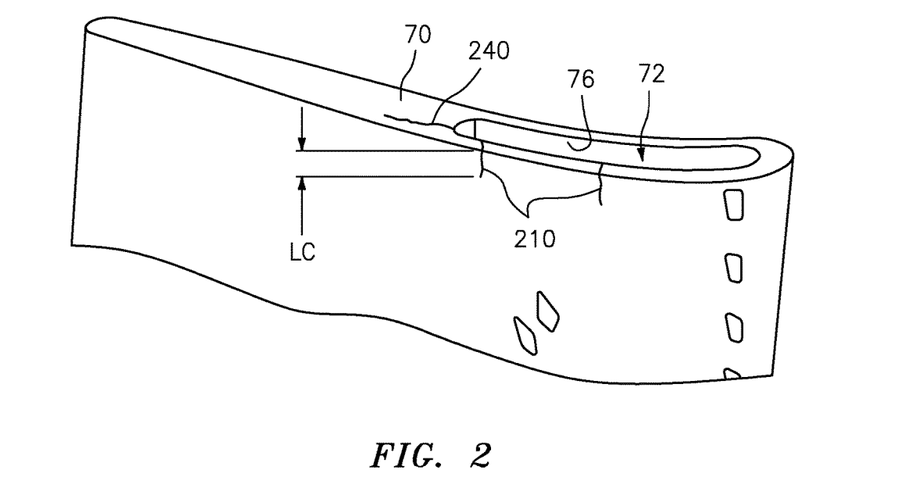
FIG. 2 is a suction side view of tip region of the blade of FIG. 1 in a damaged condition.
Figure 3:
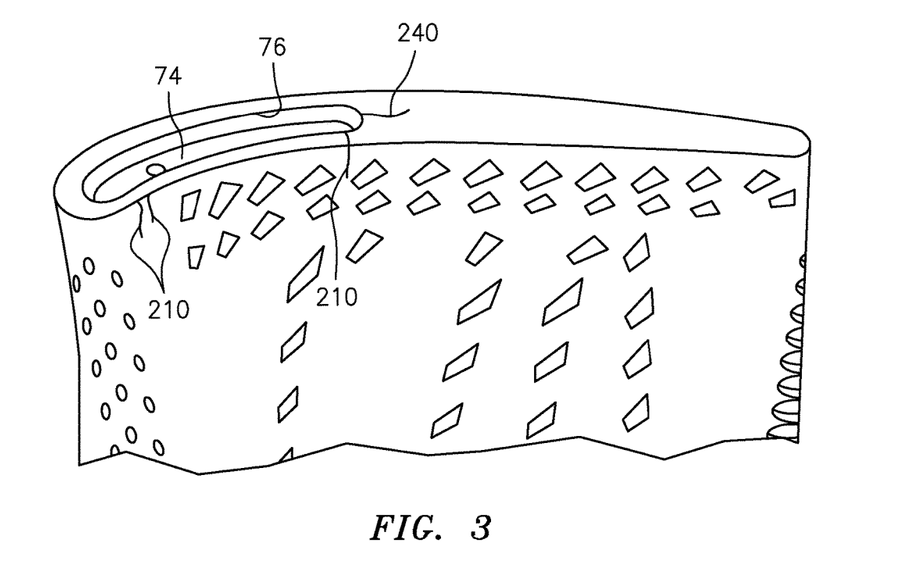
FIG. 3 is a pressure side view of a tip region of the blade of FIG. 1 in a damaged condition.

The tip 60 has a primary radially-outward facing surface 70. The surface 70 at least partially surrounds a tip squealer pocket 72 (FIG. 2) extending radially inward from the tip surface 70 and having a base 74 (FIG. 3). A lateral wall surface 76 surrounds the pocket 72 and cooperates with the pressure and suction side surfaces to define a wall structure surrounding the pocket. As noted above, the abrasive coating may be applied along the surface 70 and the TBC system may be applied along the pressure and suction side surfaces and the gaspath-facing surface of the platform.

FIG. 1 further shows various reference points, lines, and/or planes. The blade is shown in its hypothetical installed position relative to an engine central longitudinal axis (centerline) 500 which similarly forms a centerline of the disk into which the blade is mounted. A reference line 501 may be coincident with the axis 500 or spaced apart therefrom. In an exemplary embodiment, the line 501 is spaced radially outward from and parallel to the axis 500 so as to define the central axis of a cylindrical surface to which the blade tips are machined. This provides that the curvature of the blade tips corresponds to a slightly smaller cylindrical radius than the actual tip radii relative to the engine centerline (and thus relative to the corresponding curvature of the inner diameter (ID) faces of the seals with which the tips interface). The result of this curvature difference is to provide a little extra tip clearance near the leading edge and trailing edge relative to near mid-chord.

502 represents a central longitudinal plane of the engine and disk and root extending through a line 504 at the tip. The line 504 represents the first of three locations that may be used with a gauge to verify the curvature of the tip. Plane 502 may be selected to correspond to a characteristic central feature of the blade. One example is that plane 502 includes the center of gravity of the airfoil of the blade (e.g., the final airfoil). Other reference locations are possible.

The two additional references for curvature checking are lines 506 and 508 spaced apart from the plane 502 by distances S1 and S2. As is discussed further below, a reference height above a reference plane 520 at the lines 504, 506, 508 may be used to confirm curvature and measure the amount of machining and thickness of coating. The relatively small angles involved allow the height to serve as a proxy for layer thickness normal to the tip surface.

The radius of curvature of the tip is shown as RC. Because blade machining occurs with the blade off-disk in a fixture, a reference datum may be chosen relative to a feature on the blade (and thus a feature on the fixture). An exemplary reference is shown relative to a plane 520. The exemplary plane 520 is a longitudinal plane normal to the plane 502 at a given location on the root and thus of the complementary fixture.

An additional plane may be defined as perpendicular plane to both planes 502 and 520. The additional plane may also be chosen to pass thru or near the central reference (e.g., the center of gravity of the airfoil noted above). Because the additional plane is perpendicular to the engine centerline, many machined features on the blade root will be machined parallel to that additional plane. A dimension from one of the root faces may be used to locate the additional plane. The definition of the additional plane may be useful because the attachment of the blade to the disk is made by features (the root/slot) which are angled with respect to the engine centerline (by the disk "broach angle"). By providing a dimension to define the location of the additional plane from a root face, the location of plane 502 can be defined simply and accurately as well.

A dimension B0 identifies the spacing of the plane 520 from the axis 501. A dimension B1 represents a distance outboard of the plane 520 along the plane 502. Exemplary B1 may be measured at a given axial and circumferential position for various surfaces, inter-layer boundaries, and the like. Similarly, heights at the lines 506 and 508 may be defined as B2 and B3.

As noted above, the dimensions B1, B2, and B3 may be measured using a probe assembly having three spaced-apart probes each with a small roll for contacting the surface.

In use, the abrasive coating along the surface 70 will rub against an abradable coating of the associated/adjacent BOAS stage. The abrasive coating, however, may wear and be subject to other damage including cracking and oxidation. Such wear/damage may be uneven, affecting certain areas of the tip more than others. Accordingly, restoration may need to be performed well before all abrasive has been worn off.

For ease of discussion, a restoration process will be initially described as performed on an original blade (i.e., one that has not previously had a tip restoration). Progressive subsequent restorations will then be described.

After the initial use of an original blade, tip wear/damage may include combinations of one or more of: fully or partially worn-away abrasive layer 34 (e.g., see location 200 of FIG. 5); cracks 210 (see location 212) extending into the substrate (whether through any residual portion of the abrasive coating system 26 or merely from exposed substrate material where the coating system 26 has worn away); and oxidation (or other pitting) 220 (see location 222) of exposed substrate material where the abrasive coating system 26 has worn away.

For restoration, the blade may be pre-stripped of the thermal barrier coating system (e.g., via grit blasting or the like). The blade may be fixtured for precise further machining. Specifically, machining may be precisely determined relative to the original datum on the root so that machining may be to a given depth relative to the original blade substrate tip surface 70. There are several possible machining processes. In one exemplary process, the blade and the fixture in which it is held remain stationary. A numerically controlled grinding wheel of a grinding machine is traversed in an arc corresponding to the radius of curvature to which the tip is to be machined.

An initial machining may be performed in one or more steps to permit further inspection to determine the required or appropriate extent of further machining. For example, the blade may be machined to the original substrate final reference length or to a small depth below the original substrate final reference length (e.g., by a pre-set initial increment or a user-chosen initial increment). For example, a pre-set initial increment might be 0.001 inch (0.025 millimeter). Alternatively, based upon user observation, the technician might decide on a greater depth of initial machining. Thus, the technician might see a relatively high amount of damage and decide on an initial machining of a greater value up to an exemplary 0.006 inch (0.15 millimeter). Otherwise the technician could simply repeatedly machine by the fixed increment until the technician determines the surface is appropriate for further inspection.

The exemplary further inspection is a chemical-aided inspection using a fluorescent penetrant. This allows for determination of whether remaining cracks are within acceptable parameters (e.g., within acceptable locations and/or acceptable extents such as depths). The technician may also perform a visual inspection for oxidation (or this inspection may be performed as part of the initial multi-pass machining process).

In one example, axial cracks extending within the blade are not acceptable at any extent (e.g., cracks 240 of FIGS. 2 and 3) extending from the pocket toward the trailing edge). Cracks 210 along the pressure side or suction side may be allowed up to a given threshold length. For example, cracks may extend from the pocket to the pressure side or suction side and may have a given length from the original substrate final reference length at surface 70. An exemplary threshold for such a crack length LC (FIG. 2) is 0.064 inch (1.63 millimeter). This length may be measured by the difference in height (e.g., B1, B2, B3) between the radially inboard end of the crack and the original reference value of height for the substrate closest to such longitudinal and circumferential position. Alternative maximum heights may be at all limits in the range of 0.5 millimeters to 2.5 millimeters or 1.0 millimeters to 2.0 millimeters. Thus, when repaired, typical residual cracks (which may be at least partially filled by the restoration coating) may have heights of extents of an exemplary at least 0.2 millimeter or 0.5 millimeter or 1.0 millimeter subject to the aforementioned limits.

Oxidation and recessing from in-service use of the engine may be related. Oxidation will typically penetrate below the adjacent surface of the substrate. The effect will be to create a recess in the substrate. That recess may be filled by the oxidation. The machining process may essentially machine the surface of the oxidation even with the machined surface of the adjacent substrate. However, in some circumstances such as those discussed below it may be desired to partially or fully remove the oxide from the recess in the substrate. This may be done to reduce the footprint of oxide to within acceptable limits by exposing substrate material within the recess. This exposed substrate material offers better adhesion for the subsequent platings. This oxide removal may be performed by hand such as by grit blasting or with an abrasive rotary tool.

In one example, after the main machining, an oxidized area of a given footprint is grit blasted to leave a recessed area of essentially that same footprint while reducing the oxidized area to an acceptable smaller footprint within the recessed area. This grit blasting may also lower the surface of the remaining oxidized material (if any) below the surrounding substrate surface.

The amount of permitted oxidation may depend upon location along the tip (e.g., in what streamwise zone of the tip the oxidation is found). An exemplary arrangement of zones involves: a first zone 300 (FIG. 4) from the leading edge of the squealer pocket to the airfoil leading edge; a second zone 302 extending for the span of the squealer pocket; a third zone 304 (mid-chord zone) extending downstream from the squealer pocket; and a fourth zone 306 (trailing edge zone) extending from the third zone to the trailing edge. An exemplary trailing edge zone extends 0.25 inch (6.35 millimeter) forward from the trailing edge, more broadly, 5.0-10.0 millimeter.

Figure 4:
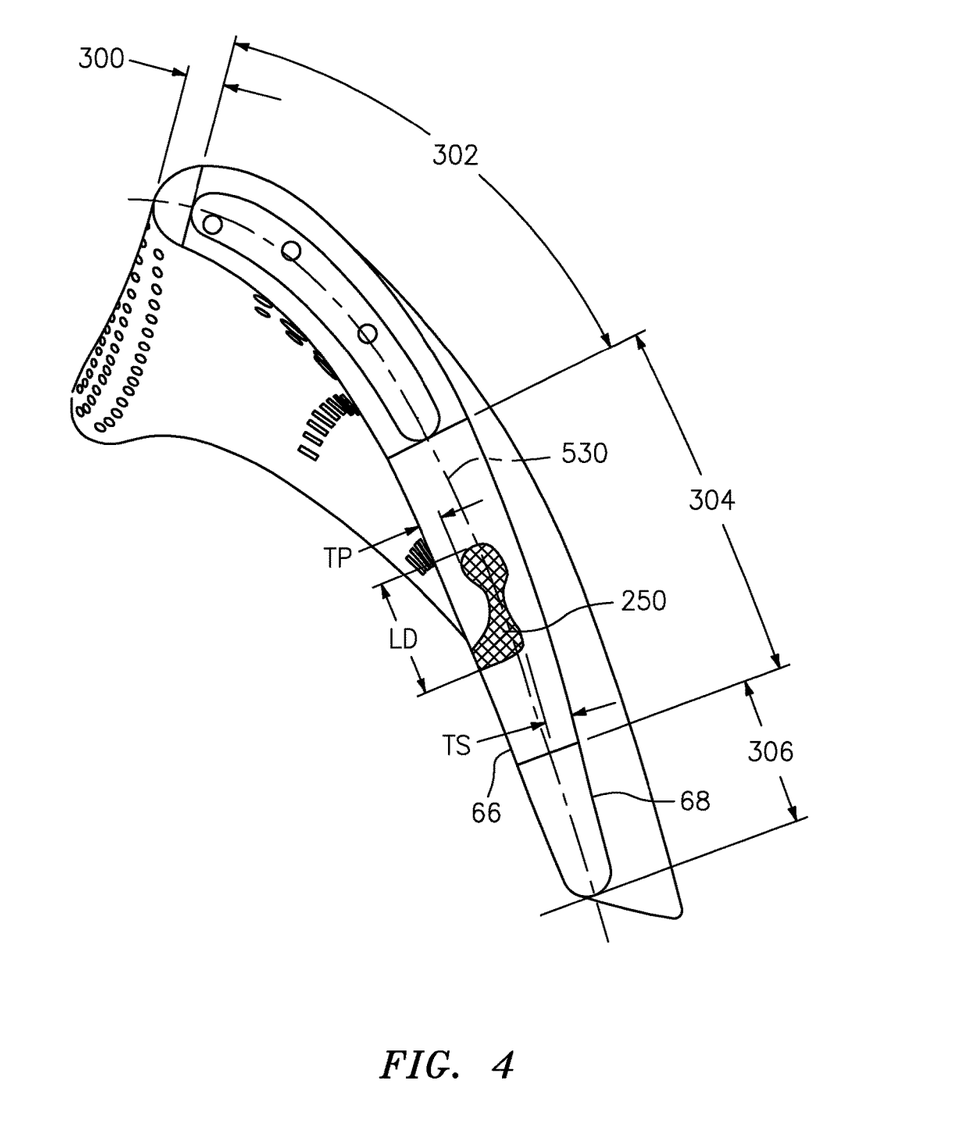
FIG. 4 is a tip-inward view of a blade in a damaged condition.

FIG. 4 also shows a local mean line 530 of the airfoil cross-section (e.g., the mean at the exposed surface shown in the FIG. 4 view). The length LD of a damage area 250 (e.g., an oxidized area or a recessed/pitted area) may be measured parallel to such mean line. The extent and positioning of the damage area 250 may also be characterized normal to the mean. These distances may, for various appropriate purposes, be measured from the mean line or from the pressure side 66 or suction side 68 toward the mean line. FIG. 4 shows dimensions TS measured from the suction side and TP measured from the pressure side.

Table I below shows exemplary acceptable parameters of oxidized or recessed areas:

TABLE I

Exemplary Acceptable Oxidation/Recessing

| Zone | LD | TS, TP | Max Depth of Recessed Areas |
|---|---|---|---|
| 300 | Recessed area may extend for full length of zone. No oxidized area permitted. | Recessed area may extend for full width of zone. No oxidized area permitted. | Specified threshold value for the particular blade. |
| 302 | Multiple areas may be oxidized or recessed to a cumulative total of a specified threshold value for the particular blade. In some examples, the damage may be limited to one of the two sides but not both (to limit chances for future blow-by). | Recessed or oxidized area may extend for full width of either concave or convex wall. In some of the examples, the damage may be limited to one of the two sides, but not both (to limit chances for future blow-by. | Specified threshold value for the particular blade. |
| 304 | Multiple oxidized or recessed areas to a cumulative total of specified threshold value for the particular blade. | Specified min. TS + TP at all locations for the particular blade. | Specified threshold value for the particular blade. |
| 306 | Recessed areas to a cumulative total of specified threshold value for the particular blade. No oxidized area permitted. | Specified min. TS + TP at all locations for the particular blade | Specified threshold value for the particular blade. |

In calculating length LD, lengthwise overlapping portions of two adjacent areas would not be double counted against the limit. In this example, where a recess in the substrate is partially filled by oxide, the depth is measured down to the surface of the oxide (i.e., the depth of the overall recess) and not to the bottom of the oxide layer. If a test was not satisfied, a further action would be performed to remove down to a deeper level. Depending on the nature of the violation, this might include overall machining on the arc or a local process such as the hand machining or the grit blasting noted above.

Where recessing is permitted, exemplary actual depth values may include recess depths of an exemplary at least 0.0005 inch (0.013 millimeter) or at least 0.001 inch (0.025 millimeter) or at least 0.002 inch (0.051 millimeter) among all other values up to the limits). Where oxidation is permitted, exemplary oxide layer depths may include thicknesses of an exemplary at least 0.0005 inch (0.013 millimeter) or at least 0.001 inch (0.025 millimeter).

In the zone 302 for exemplary blades, the permitted length values may include values of at least 1.0 mm or at least 2.0 mm.

In this zone 304 example, exemplary minimum TS+TP is met because where a trailing portion of the damage site 250 reaches the pressure side 66 there is enough TS to meet the test even though TP is zero.

In the zone 304 for exemplary blades, the permitted length values may include values of at least 1.0 mm or at least 2.0 mm. among all other values up to the limits.

Similarly, the TP and TS dimensions in zone 304 may leave a variety of widths of oxidized and/or recessed areas. For example, exemplary widths would typically include values of 0.5 millimeter and 1.0 millimeter up to the allowed value. As a characterization, the term "transverse dimension" may generically reference a dimension transverse to the depth thus including the length and width.

Similarly in the zone 306, acceptable width might be somewhat smaller than in the zone 304. These still would likely include values of 0.3 millimeter and 0.5 millimeter and 1.0 millimeter up to the allowed value.

Figure 6:
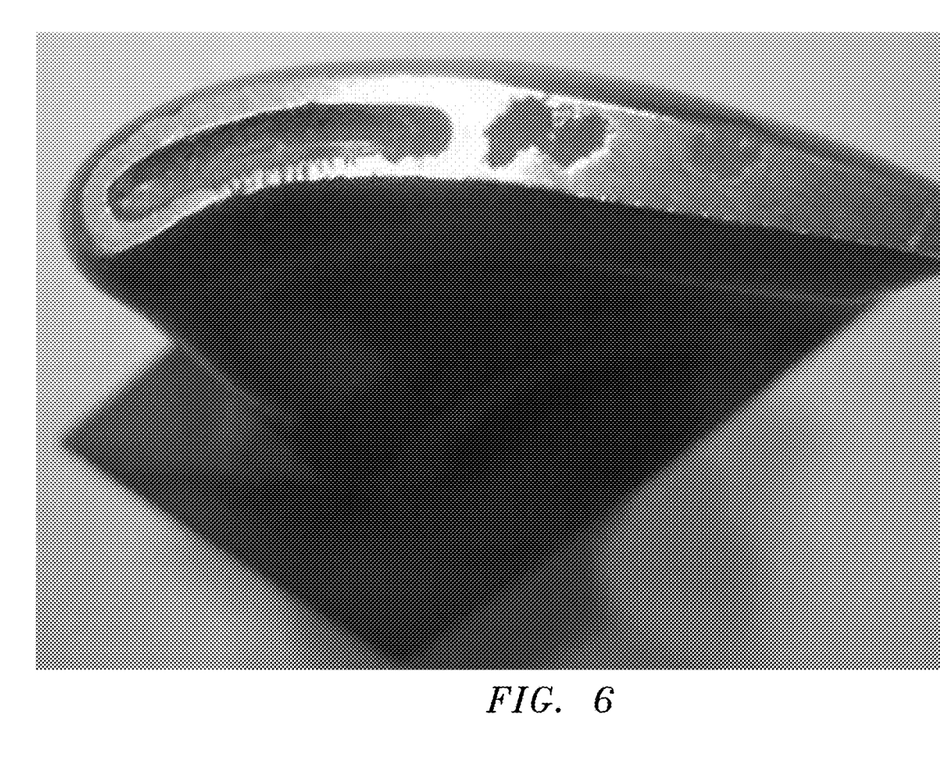
FIG. 6 is a photograph of a machined blade tip during a repair process.

FIG. 6 shows residual oxidation of acceptable extent along the pressure side wall of the tip pocket in zone 302 and aft of the tip pocket along zone 304. In zone 302, the oxidation is limited to the pressure side wall. By limiting the damage to one of the two walls, chances for leakage across the tip during engine operation are reduced. In the zone 304, total damage length is close to the exemplary limit. An upstream oxidized and recessed area reaches close to the suction side at many locations and hitting at one. A downstream oxidized and recessed area reaches the suction side along a greater length. In this example, a maskant (e.g., UV-cure) has been applied to the blade exterior and interior after the initial machining and before the final machining and plating. The final machining removes maskant from the tip, to leave the tip exposed. This protects surfaces away from the tip from plating contamination.

Figure 7:
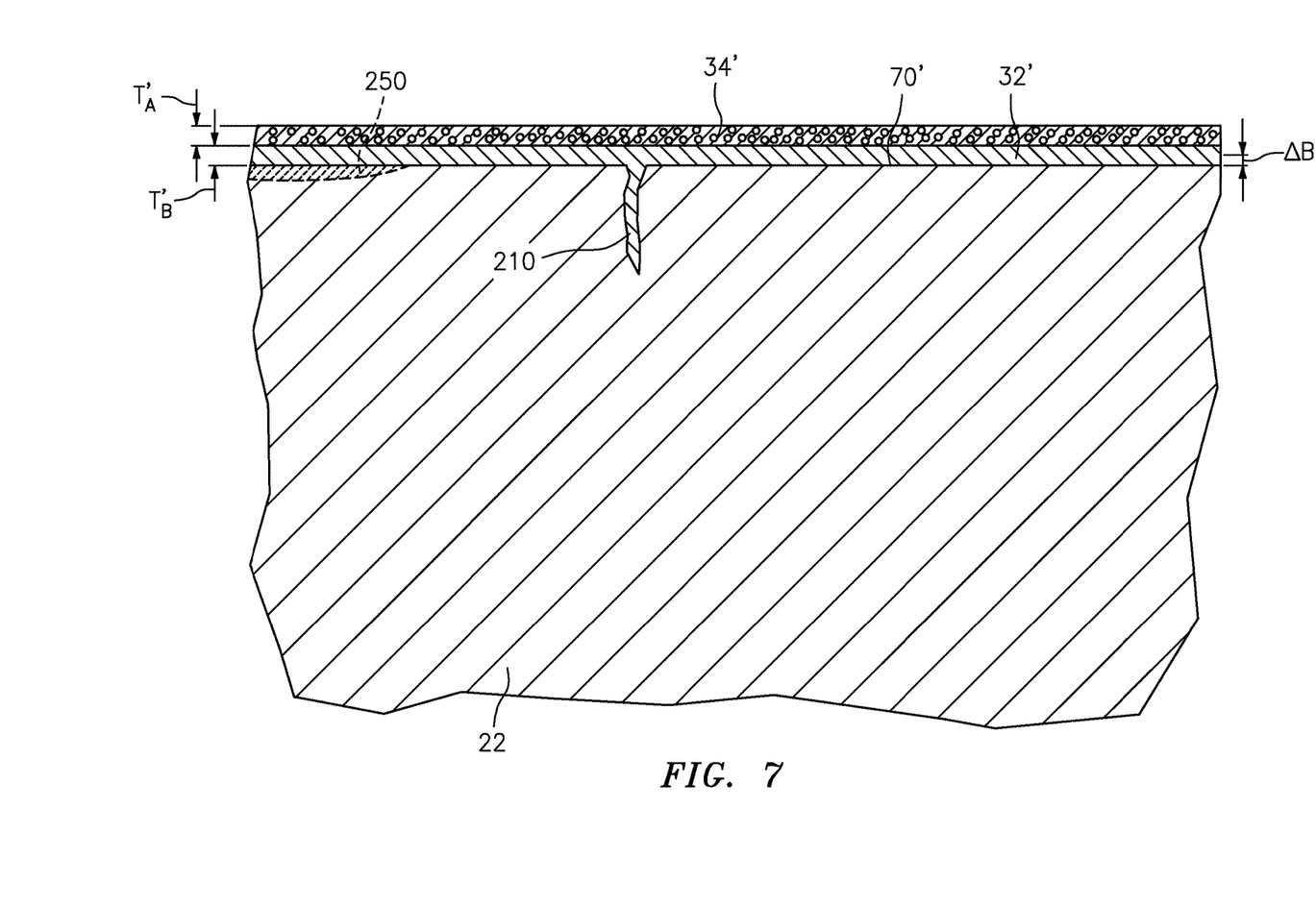
FIG. 7 is an enlarged simplified sectional view of a restored blade tip.

FIG. 7 shows a restored tip. The substrate surface has been machined down to 70' by a dimension ΔB relative to the original reference length of the surface 70. A base layer 32' has a thickness T'$_B$ along machined portions of the surface 70'. Thickness will be greater along defects such as at pitting/recessing 250 and the crack 210. FIG. 7 shows the material of the base layer 32' filling the pits and crack. The base layer may be a nickel electroplate otherwise similar to the base layer 32 but thicker by the amount ΔB (plus thickness in filling defects). In this example, the abrasive layer 34' is essentially unchanged relative to the original abrasive layer 34 and may be applied by similar technique. Accordingly, its thickness T'$_A$ may be similar to the original thickness T$_A$ of FIG. 5.

An exemplary T$_A$ is 0.0055 inch (0.14 millimeter), more broadly 0.0045 inch to 0.0065 inch (0.11 millimeter to 0.17 millimeter) or 0.10 millimeter to 0.20 millimeter.

An exemplary TB is 0.0025 inch (63.5 micrometers), more broadly 0.0005 inch and 0.0045 inch (13 micrometers to 0.11 millimeter). Accordingly, exemplary T'$_B$ is 0.0005 inch to 0.0135 inch (13 micrometers to 0.34 millimeters), more broadly 13 micrometers to 0.40 millimeter. The low end of those ranges merely represents machining back to original substrate height. Accordingly ranges associated with greater cutback may include a lower end selected from 0.050 millimeter or 0.10 millimeter or 0.15 millimeter or 0.20 millimeter or 0.25 millimeter and an upper end selected from 0.50 millimeter 0.40 millimeter or 0.35 millimeter. Such lower ends may exist independently of upper ends.

The restored blade of FIG. 7 may be put into service and may then become subject to similar wear and damage as was the original blade. Similar subsequent restorations may be performed (thus each time increasing ΔB). Each subsequent restoration may comprise a similar machining preparation to that applied to the original blade post-service.

In one example, the blades are marked with an indication of whether they have had previous restoration. This may be used to determine an extent of machining greater than that used for a blade in its first restoration. Alternatively, the same height may initially be machined followed by further machinings in view of observed condition (e.g., further machinings to get through any remaining plating and then yield substrate surface with sufficient condition).

In an alternative exemplary process, the blades have been inventoried by serial number and the nature of prior restorations has been recorded in a database. Accordingly, the reference substrate heights at the then-current (after the blade is removed from the engine but before machining) surface 70' is known. Accordingly, any predetermined increment of machining may be relative to this known length in the same way as the initial machining of the original blade post-service was by an increment relative to the original length.

Subsequent restorations after the first restoration may involve machining that leaves some of the base layer 32' in place. In particular, this may comprise base layer that has filled prior defects below the machined (i.e., of the subsequent repair) tip surface.

Possible process variations involve balancing blades of a given stage by having the substrates machined to the same heights for all blades of a given stage. This may be implemented by using blades in sets such that blades taken off of a given stage of an engine are put back as a stage either on the same engine or a different engine. In such a situation, all blades of a given stage would be machined to heights necessary to allow restoration of the worst blade in such stage.

This process may additionally or alternatively improve batch efficiency by allowing all blades (or all blades repairable by the present process) be machined to a given depth/length to have their base layers plated in a batch. Thus, the blades that required another repair (e.g., weld or braze of a tip preform or non-preform weld build-up repair) could be segregated/separated. The remaining repairable blades could then be machined to the depth/length associated with the worst.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for repairing a blade, the blade comprising:
   a metallic substrate shaped to define:
      an airfoil having a tip; and
   a coating on the tip,
   the method comprising:
      machining to at least partially remove the coating while leaving one or more artifacts of service damage;
      plating a nickel-based base layer; and
      plating an abrasive layer comprising a nickel-based matrix and an abrasive,
   wherein:
      the machining reaches the substrate;
      the substrate has oxidation along the tip; and
      the machining only partially removes the oxidation to leave an oxidized area as one of the one or more artifacts of service damage.

2. The method of claim 1 wherein:
   the substrate has a crack as one of the one or more artifacts of service damage; and
   the machining only partially removes the crack.

3. The method of claim 1 wherein:
   the oxidized area has a thickness of at least 0.025 millimeter.

4. The method of claim 1 wherein:
   the oxidized area has a transverse dimension of at least 0.5 millimeter.

5. The method of claim 1 performed a plurality of times on a given blade wherein:
   each time, the plating of the nickel-based layer is progressively deeper than the prior time.

6. The method of claim 1 further comprising:
   applying a ceramic coating along surfaces of the airfoil after the plating the abrasive layer.

7. The method of claim 1 wherein:
the nickel-based base layer comprises a nickel-chromium-aluminum alloy.

8. The method of claim 1 wherein:
the machining comprises a first machining and a second machining; and
the method further comprises:
  inspecting after the first machining; and
  responsive to the inspecting, determining a target depth for the second machining.

9. The method of claim 8 further comprising:
masking of the substrate before the second machining.

10. A blade repaired according to the method of claim 1.

11. The blade of claim 10 wherein:
one or more cracks in the substrate as one or more of the one or more artifacts of service damage, at least partially filled by the nickel-based layer have height of at least 0.5 millimeter.

12. The blade of claim 11 wherein:
the nickel-based layer has height of at least 0.0050 inch (0.13 millimeter).

\* \* \* \* \*